United States Patent [19]

Lang et al.

[11] Patent Number: 5,711,282
[45] Date of Patent: Jan. 27, 1998

[54] METHOD FOR FORMING A FUEL-AIR MIXTURE AND FUEL SUPPLY DEVICE FOR AN INTERNAL COMBUSTION ENGINE

[75] Inventors: Ernst-Walter Lang, Gerlingen; Klaus Joos, Walheim, both of Germany

[73] Assignee: Robert Bosch GmbH, Stuttgart, Germany

[21] Appl. No.: 663,723

[22] Filed: Jun. 14, 1996

[30] Foreign Application Priority Data

Jun. 17, 1995 [DE] Germany .................. 195 22 075.7

[51] Int. Cl.$^6$ .............. F02M 21/02; F02M 31/125; F02M 69/30; F02M 71/04
[52] U.S. Cl. .................. 123/549; 123/557; 123/514
[58] Field of Search .................. 123/549, 179.21, 123/557, 547, 545, 546

[56] References Cited

U.S. PATENT DOCUMENTS

| | | | |
|---|---|---|---|
| 4,181,111 | 1/1980 | Sanada et al. | 123/547 |
| 4,318,384 | 3/1982 | Moffett | 123/557 |
| 4,684,341 | 8/1987 | Kawamura et al. | 123/179.21 |
| 5,019,120 | 5/1991 | Lewis et al. | 123/557 |
| 5,398,663 | 3/1995 | Kulasinghe | 123/557 |
| 5,529,035 | 6/1996 | Hunt et al. | 123/179.21 |

FOREIGN PATENT DOCUMENTS 4119206  12/1991  Germany .
2248087   3/1992  United Kingdom .

*Primary Examiner*—Marguerite McMahon
*Attorney, Agent, or Firm*—Edwin E. Greigg; Ronald E. Greigg

[57] ABSTRACT

The invention relates to a method for forming a fuel-air mixture and to a fuel supply device for an internal combustion engine, having an intake manifold, into which an air intake tube with an aspirated air metering device disposed in it discharges and to which the intake tubes leading to individual combustion chambers are connected. A plurality of fuel injection valves are provided, each of which is assigned to one combustion chamber, and having a central fuel vaporizer to which fuel can be supplied by means of a fuel metering device. To form a fuel-air mixture, the fuel to be supplied to the engine is vaporized and the fuel vapor is supplied to the aspirated air. In order to lower pollutant emissions after starting during the warmup phase of the engine, vaporization of the fuel is done at relatively low temperatures, so that the fuel vapor produced essentially comprises only highly volatile fuel components. The fuel vapor produced by the fuel vaporizer in a vaporization region is supplied, downstream of the aspirated air metering device to the air aspirated by the combustion chambers in order to form a fuel-air mixture.

17 Claims, 2 Drawing Sheets

METHOD FOR FORMING A FUEL-AIR MIXTURE AND FUEL SUPPLY DEVICE FOR AN INTERNAL COMBUSTION ENGINE

BACKGROUND OF THE INVENTION

The invention relates to a method for forming a fuel-air mixture and to a fuel supply device for an internal combustion engine.

In a known fuel supply device (German Patent Disclosure DE 41 19 206 A1), an injection valve is provided in the vicinity of the inlet region of each combustion chamber of an internal combustion engine, and to form a fuel-air mixture injects fuel into the respective intake tube or into the inlet region of the combustion chamber. This reference also proposes an air supply conduit, with a control valve disposed in it, which on the inlet side communicates with a segment of an air intake tube located upstream of a throttle valve and on the outlet side discharges into the fuel outlet region of the respective injection valve.

Through the air supply conduit, air can be blown into the fuel outlet region of the injection valve in the warmup phase of the engine, in order to reinforce fuel atomization. The supply of air through the air supply conduit is controlled by the control valve as a function of the engine rpm, the negative aspiration pressure, the engine temperature, and/or other engine operating parameters.

In such conventional fuel supply devices, it is difficult in the cold engine after starting in particular to keep hydrocarbon emissions low until effective catalytic converter operation ensues and to improve exhaust quality while the engine is cold enough that even lower exhaust gas limit values in the future can still be adhered to.

A problematic aspect is that with the cold engine a larger quantity of fuel must be supplied than with a warm engine, to achieve an ignitable fuel-air mixture in the combustion chamber having a certain proportion of fuel in vapor form. A large proportion of the injected fuel strikes the cold walls of the intake tubes and combustion chamber and forms a wall film there. Some of this wall film fails to contribute to combustion and in particular is expelled along with the exhaust gas as excess hydrocarbon. This undesirably increases hydrocarbon emissions during the warmup phase of the engine.

Another known fuel supply device (British Patent 2 248 087 A) has an air intake line with a throttle valve disposed in it; this line discharges into an intake manifold, branching off from which intake tubes lead to the various engine combustion chambers. In the vicinity of the inlet region of the various combustion chambers, there are injection valves with which fuel is injected into the applicable intake tubes to form a fuel-air mixture. An engine control unit controls fuel injection as a function of the quantity of air aspirated through the air intake line and of other engine operating parameters.

The engine control unit also acts upon a central injection valve having an associated fuel vaporizer that is disposed downstream of the throttle valve in the air intake line, in order to supply vaporized fuel to the aspirated air.

In this known fuel supply device, the formation of the fuel-air mixture during idling and partial-load operation of the engine takes place by means of the central injection valve, while in full-load operation, only the individual injection valves are used for supplying fuel.

In known fuel supply devices of this kind, the entire amount of fuel injected into the vaporizer is vaporized if at all possible. As a consequence, during the warmup phase a large proportion of the fuel in vapor form, on being aspirated by the engine, condenses in colder zones of the engine and forms an undesired wall film, which in particular leads to an increase in hydrocarbon emissions.

However, engine exhaust gas limit values, which in future will become stricter and stricter, can be met only if hydrocarbon emissions can successfully be lowered drastically in the period from starting of the engine until the onset of effective catalytic converter operation.

OBJECT AND SUMMARY OF THE INVENTION

The method of the invention which can especially advantageously be performed with a fuel supply device has the advantage over the prior art that there is hardly any deposit, or none at all, of the highly volatile fuel components on the walls of the intake tubes or combustion chambers, and in particular this is so even when the engine is cold. Since no wall film formation occurs in the intake region and in the combustion chamber, only a slight quantity of fuel is required to form the fuel-air mixture. In addition, because the fuel is vaporized in the manner according to the invention, maximum-quality preparation of the fuel while the engine is cold is attainable. Hydrocarbon emissions, in particular, can therefore be markedly reduced after engine starting during the warmup phase, so that even future stringent exhaust gas limit values can still be met.

The fuel supply device according to the invention has the advantage that fuel vapor can be supplied to the air aspirated by the combustion chambers in such a way that its path to the respective combustion chamber can be shortened and the danger of wall film formation can be reduced still further.

By means of the provisions recited herein, advantageous further features of and improvements to the method and the fuel supply device are attainable.

It is especially advantageous if the fuel vapor generated in the fuel vaporizer is carried as far as the inlet region of the combustion chambers via a fuel vapor line arrangement, since as a result the possibility of condensation of the vaporized fuel is reduced further, because the fuel vapor line arrangement has a markedly smaller surface area and a smaller volume.

Advantageously, the fuel vaporizer is arranged such that some of the air aspirated by the engine flows through it, thus improving the transportation of the vaporized fuel and at the same time achieving scavenging of the fuel vaporizer with air. This also improves the fuel discharge performance of the fuel vaporizer.

Since in the fuel vaporizer only the highly volatile components leave the fuel, while the other fuel components are returned to the fuel tank via a return line, highly volatile components are removed from the fuel before reaching the fuel tank, thus providing some relief for a tank venting system. In particular, the fuel in the fuel tank can be allowed to reach higher temperatures without overloading the tank venting system. Tank heating from the returning heated fuel, given the relatively short period of operation of the fuel vaporizer in the warmup phase of the engine and given the slight flow of fuel, is thus negligible.

Another advantage of the invention is that a readily controllable metering of the fuel-air mixture can be achieved. Another advantage is that the fuel supply device of the invention is a diagnosable system, in which in the event of a malfunction, such as failure of the fuel vaporizer, it is possible immediately to begin injection through the injection valve.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
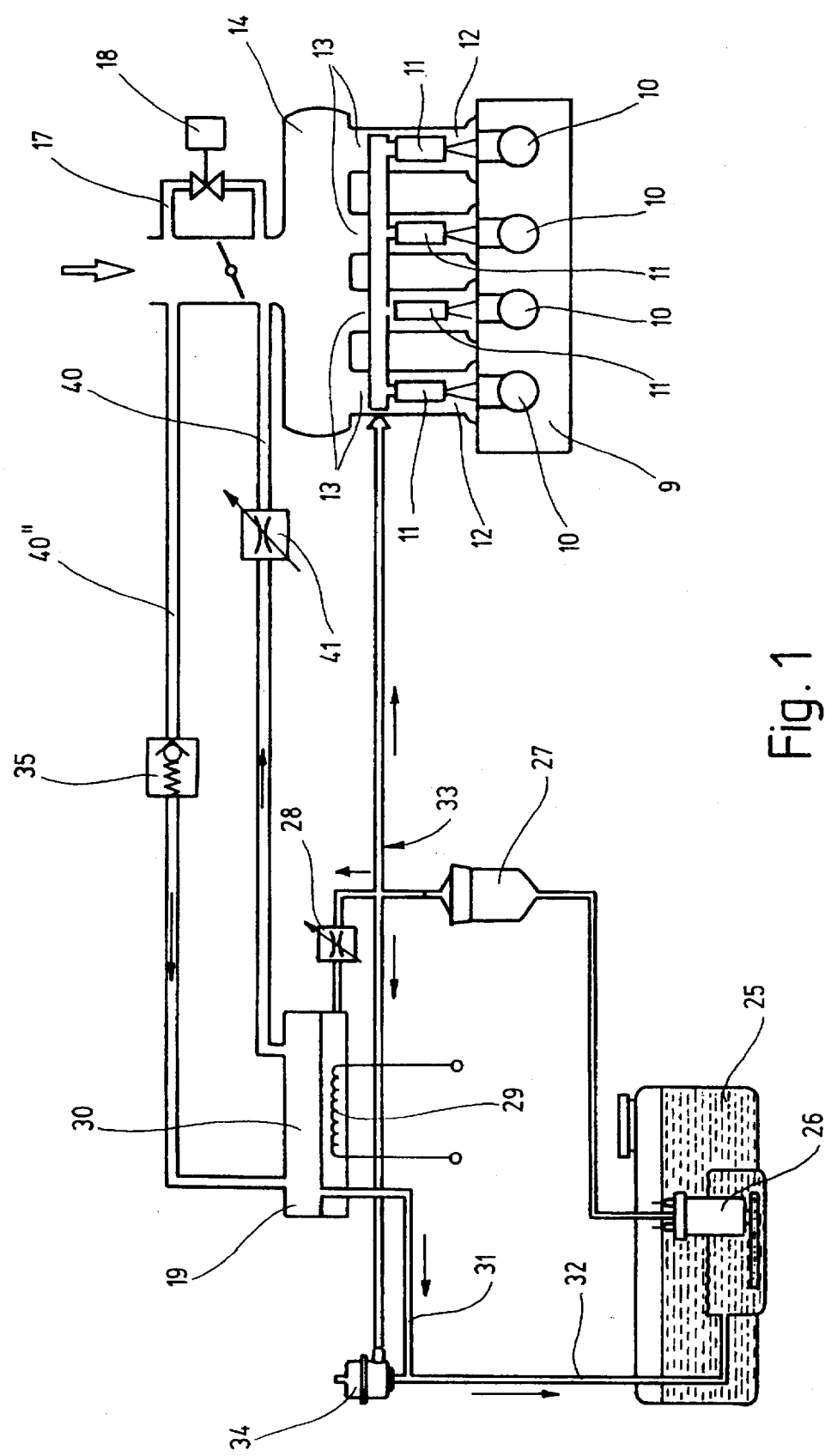
FIG. 1 is a schematic illustration of a fuel supply device in accordance with a first exemplary embodiment of the invention.

In the various drawing figures, components that are equivalent to one another are provided with the same reference numerals.

FIG. 1 shows a fuel supply device for an internal combustion engine 9, whose combustion chambers 10 are each assigned one injection valve 11, in such a way that fuel supplied to the injection valve 11 is injected to an inlet region 12 of an intake tube 13 leading to the combustion chamber 10. On the inlet side, the intake tubes 13 are connected to an intake manifold 14, which communicates with an air intake tube 15. As an aspirated air metering device, a throttle valve 16 is disposed in the air intake tube 15. An idling air line 17 with an idling adjusting device 18 is provided in the region of the throttle valve 16.

A fuel vaporizer system is provided parallel to the idling adjusting device 18. This system substantially comprises a scavenging line 40", a one-way check valve 35, a fuel vaporizer 19, and a fuel vapor line 40 with a fuel vapor adjuster 41. From a fuel tank 25, fuel is supplied to the fuel vaporizer 19 by a fuel pump 26 via a fuel filter 27 and a fuel metering device 28, which is advantageously an electromagnetically actuatable, clocked switching valve, but which also may be embodied in some other suitable way, such as in the form of a throttle valve or the like; in the fuel vaporizer, the fuel is vaporized via an electrically heated vaporizer structure 29, which is associated with a vaporization region 30. Nonvaporized fuel, especially not easily volatile components of the fuel, are returned to the fuel tank 25 via a return line 31, 32.

The vaporizer structure 29 may be a heating surface, over which the fuel to be vaporized runs in the form of a film of liquid, or onto which the fuel is sprayed, finely atomized, via a nozzle not shown. The maximum heating output of the fuel vaporizer 19 depends on the maximum required inflow of fuel.

The fuel inflow to the fuel vaporizer 19 is controlled by means of the fuel metering device 28 by an engine control unit, not shown, in a manner tuned to engine operation during the warmup phase. The heating output is controlled by the engine control unit as a function of the fuel inflow, preferably in proportion thereto.

To adjust the fuel pressure in the fuel line arrangement 33 adjoining the fuel filter 27 to a suitable level, a pressure limiter 34 is provided, which likewise communicates with the fuel tank 25 via the return line 32.

In order to reliably preclude fuel from the fuel vaporizer 19 from flowing back via the scavenging line 40" into the region of the air intake tube 15 located upstream of the throttle valve 16, the check valve 35 is provided.

In the fuel supply device described, after starting of the engine 9, during the warmup phase initially a slight fuel flow, such as 1 l/h to 10 l/h is supplied via the fuel metering device 28 only to the fuel vaporizer 19, so as to furnish the requisite fuel vapor for forming a suitable fuel vapor-air mixture. The required scavenging air is delivered to the fuel vaporizer 19 via the scavenging line 40" as a consequence of the pressure drop in the air intake tube 15 across the throttle valve 15, so that the aspirated air entrains fuel vapor from the vaporization region 30 of the fuel vaporizer 19. Accordingly, scavenging of the fuel vaporizer 19 takes place, utilizing the pressure drop upstream and downstream of the throttle valve 16.

The air mass required by the engine is adjusted via the throttle valve 16 and the idling adjusting device 18, in particular an idling adjuster. The fuel mass required by the engine is metered or dosed by the fuel vapor adjuster 41, embodied for instance in the form of an electromagnetically actuated final control element. During the operation of the fuel vapor adjuster 41, the injection valves 11 remain inactive.

The gaseous fuel-air mixture formed in the fuel vaporizer 19 is introduced downstream of the throttle valve 16 into the air intake tube 15, or in a manner not shown into the intake manifold 14, from which via the intake tubes 13 it reaches the individual combustion chambers 10 of the engine 9.

The vaporization of fuel expediently takes place in the fuel vaporizer 19 at a relatively low temperature, in the range from 60° to 80° C., preferably at 65° to 75° C. and in particular at 70° C., so that only highly volatile components of the fuel (butanes, pentanes, hexanes) are used to form the fuel-air mixture. Since only fuel vapor that does not back-condense or does so only very slightly is added to the fuel-air mixture, a lesser quantity of fuel, compared with conventional fuel supply methods and devices, suffices to obtain an ignitable fuel-air mixture during the warmup phase, and thus the hydrocarbon emissions during the warmup phase can be markedly reduced.

After the warmup phase, the fuel metering device 28 and the adjuster 41 are then kept closed, and further fuel supply via line 33 to the engine 9 is taken over by the injection valves 11. If the fuel vaporizer 19 and/or the fuel metering device 28 should fail, then in the device of the invention, fuel injection can be begun immediately via line 33.

Figure 2:
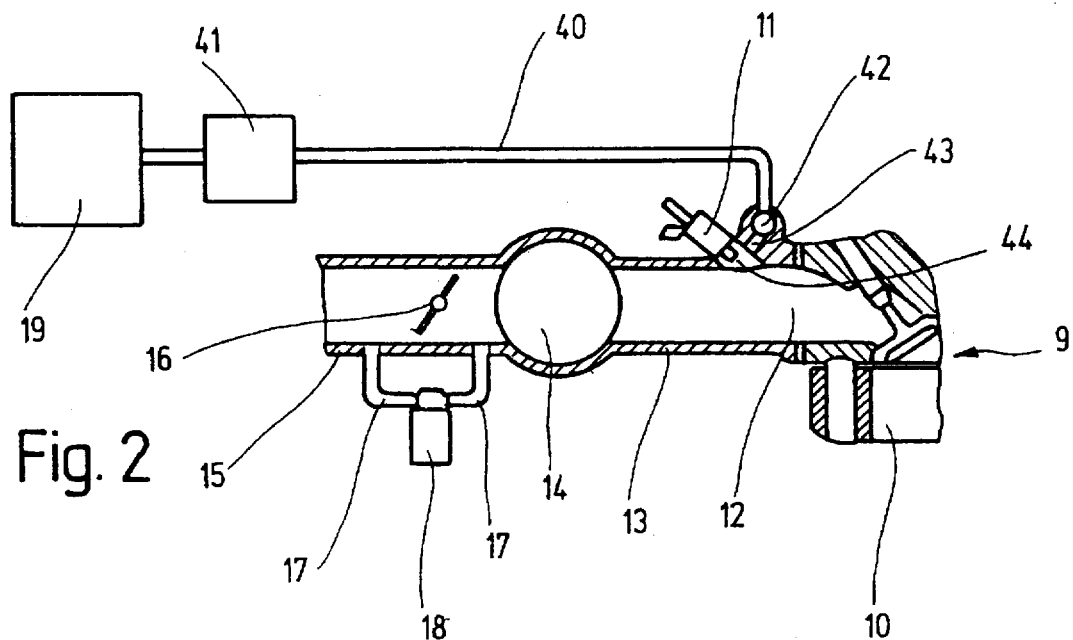
FIG. 2 schematically shows a second exemplary embodiment of the present invention.

The fuel supply device of FIG. 2 has a central fuel vaporizer 19, which communicates with a fuel supply line and a fuel return line in a manner not shown in further detail. A fuel vapor line 40, in which an adjuster 41 for central metering of fuel vapor is disposed, connects the outlet of the fuel vaporizer 19 to a fuel vapor distributor line 42, which extends across the injection valves 11 and discharges via outlet openings 43 into the fuel outlet regions 44 of the injection valves 11.

In the fuel supply device described in conjunction with FIG. 2, during the warmup phase after engine starting fuel vapor from the fuel vaporizer 19 is carried via the adjuster 41 for metering the requisite quantity of fuel vapor and via the fuel line 40 and the fuel vapor distributor line 42 of a fuel vapor line arrangement into the inlet region 12 of the intake tubes 13, and from there together with the aspirated air reaches the combustion chambers 10.

In this exemplary embodiment of the invention, the fuel vapor for each cylinder is accordingly carried up to the inlet region 12 of the intake tubes 13 in a separate tubing system, and as a result condensation of the fuel vapor on the walls of the line can be largely prevented.

Here as in the exemplary embodiment of FIG. 1, it is expedient to operate the fuel vaporizer 19 at a relatively low temperature, that is, in the range from 60° to 80° C., and in particular at 70° C. Thus during the warmup phase, for forming the fuel-air mixture, only fuel vapor from highly volatile fuel components are used, so that a lesser quantity of fuel suffices, and hydrocarbon emissions can be markedly reduced.

After the completion of the warmup phase, fuel supply is taken over by the injection valves 11. The separate tubing system for supplying the fuel vapor is advantageous here, because it has no influence on intake tube dynamics during normal operation.

Figure 3:
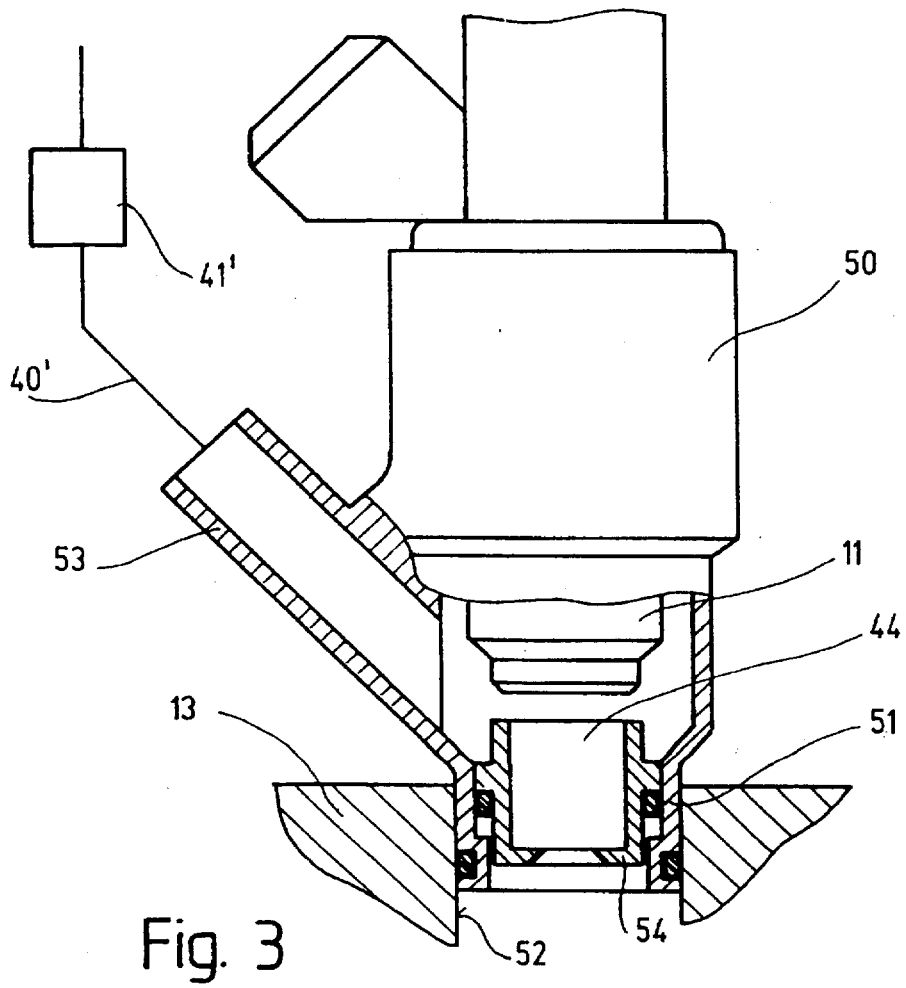
FIG. 3, partly in section, shows a fuel injection valve with a fuel vapor supply connection for a fuel supply device according to the invention.

FIG. 3 shows another possibility of directly introducing fuel vapor into the fuel outlet region 44 of an injection valve 11 that is disposed in a housing 50.

The housing 50 is inserted and retained tightly by a connection neck 51 into an opening 52 of the intake tube 11 and has a gas supply neck 53 through which air, fuel vapor, or a mixture of fuel vapor and air can be supplied via a fuel vapor line 40'. Upstream of the fuel outlet region 44 of the injection valve 11, a gas carrying and fuel atomizing means 54, which is only purely schematically, is inserted into the connection neck 51 of the housing 50.

The fuel vapor line 40' may communicate with the fuel vaporizer 19, not shown in FIG. 3, via a central adjuster 41 for metering a requisite quantity of fuel vapor. In this arrangement, however, it is preferable if, as shown in FIG. 3, an individual adjuster 41' for each combustion chamber for measuring the requisite fuel vapor quantity is provided in each fuel vapor line 40' leading to the fuel outlet region 44 of an injection valve 11, and if this adjuster is connected on the inlet side to the central fuel vaporizer 19.

Fuel vapor produced in the fuel vaporizer 19 is then distributed, in a manner not shown in detail, first to fuel vapor lines 40', so that the fuel vapor to be supplied to the individual combustion chambers 10 can be metered individually to each combustion chamber 10 by means of the individual adjusters 41'.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the U.S. is:

1. A method for forming a fuel-air mixture for an internal combustion engine during a warmup phase of the engine after starting the engine, which comprises, supplying fuel to be supplied to an engine from a fuel tank to a vaporizer at a relatively low temperature of the engine, at least partially vaporizing the fuel in the vaporizer at a temperature from 60° to 80°, supplying the vaporized fuel to an air input to the engine and mixing the vaporized fuel with the air aspirated by the engine, returning the non-vaporized fuel components to said fuel tank whereby only highly volatile fuel components exist for forming the fuel-air mixture directed to the engine.

2. The method of claim 1, in which the fuel is vaporized at a temperature from about 60° to about 80° C., preferably at a temperature between 65° and 75° C., in particular at 70° C.

3. A method of claim 1, in which a slight fuel flow, in a range from about 1 l/h to 10 l/h, is vaporized.

4. A method of claim 2, in which a slight fuel flow, in a range from about 1 l/h to 10 l/h, is vaporized.

5. A method of claim 1, in which the fuel is vaporized at a temperature of 70° C.

6. A fuel supply system for an internal combustion engine which comprises, an intake manifold (14), an air intake tube (15) With an aspirated air metering device (16) disposed in said intake manifold, said air intake tube discharges into said intake manifold, and intake tubes (13) lead from said intake manifold to individual combustion chamber (10), a plurality of fuel injection valves (11), each of which is assigned to one each combustion chamber (10), and a central fuel vaporizer (19), to which fuel is supplied by means of a fuel metering device (28), and fuel vapor produced by the fuel vaporizer (19) in a vaporization region (30) is supplied downstream of the aspirated air metering device (16) to air aspirated by the combustion chambers (10), for forming a fuel-air mixture, whereby the fuel is vaporized within said central fuel vaporizer (19) at a temperature from 60° C. to 80° C. so that only highly volatile components exist for forming the fuel-air mixture, and means for returning the non-vaporized fuel components to the fuel tank.

7. A fuel supply system of claim 6, in which the fuel vaporizer (19) is disposed in a fuel vapor line (40) and communicates on an outlet side with the air intake tube (15) or the intake manifold (14), and the fuel vapor flow from the fuel vaporizer (19) is controllable by means of a fuel vapor adjuster (41).

8. A fuel supply system of claim 6, which includes a scavenging line and air supplied to the fuel vaporizer (19) via said scavenging line (40") flows through the vaporization region (30) of the fuel vaporizer (19).

9. A fuel supply system of claim 7, which includes a scavenging line and air supplied to the fuel vaporizer (19) via said scavenging line (40") flows through the vaporization region (30) of the fuel vaporizer (19).

10. A fuel supply system of claim 6, in which the fuel vaporizer (19) communicates on an outlet side with the individual intake tubes (13) via a fuel vapor line arrangement (40, 41, 42; 40', 41').

11. A fuel supply system of claim 10, in which the fuel vapor line arrangement (40, 41, 42) has a distributor conduit (42), which communicates in the region of the injection valves (11) with each intake tube (13).

12. A fuel supply system of claim 10, in which the fuel vapor line arrangement includes a plurality of fuel vapor lines (41'), each of which is assigned to one combustion chamber (10), each of which discharges into the corresponding intake tube (13) in a region of the injection valve (11), and includes an adjuster (41'), in order to individually control the supply of fuel vapor to the individual combustion chambers (10).

13. A fuel supply system of claim 12, in which the adjuster (41') is embodied in the form of an electromagnetically actuatable switching valve (28).

14. A fuel supply system of claim 6, in which an electromagnetically actuatable switching valve (28) is provided as the fuel metering device, with which the fuel can be supplied to the fuel vaporizer (19) in clocked fashion.

15. A fuel supply system of claim 6, in which the fuel vaporizer (19') communicates with a fuel tank (25) via a return line (31, 32).

16. A fuel supply system of claim 6, in which the fuel vaporizer (19) has at least one heating surface onto which the fuel to be vaporized is supplied and which is associated with the vaporization region (30).

17. A fuel supply system of claim 6, in which the heating output of the fuel vaporizer (19) is controllable by an electronic control unit.

* * * * *